March 15, 1960  H. A. OWEN ET AL  2,928,302
MEANS FOR ACHIEVING A PREDETERMINED EXTENT OF LOADING
IN TIGHTENING UP NUTS ON BOLTS AND STUDS
Filed June 19, 1956  2 Sheets-Sheet 1
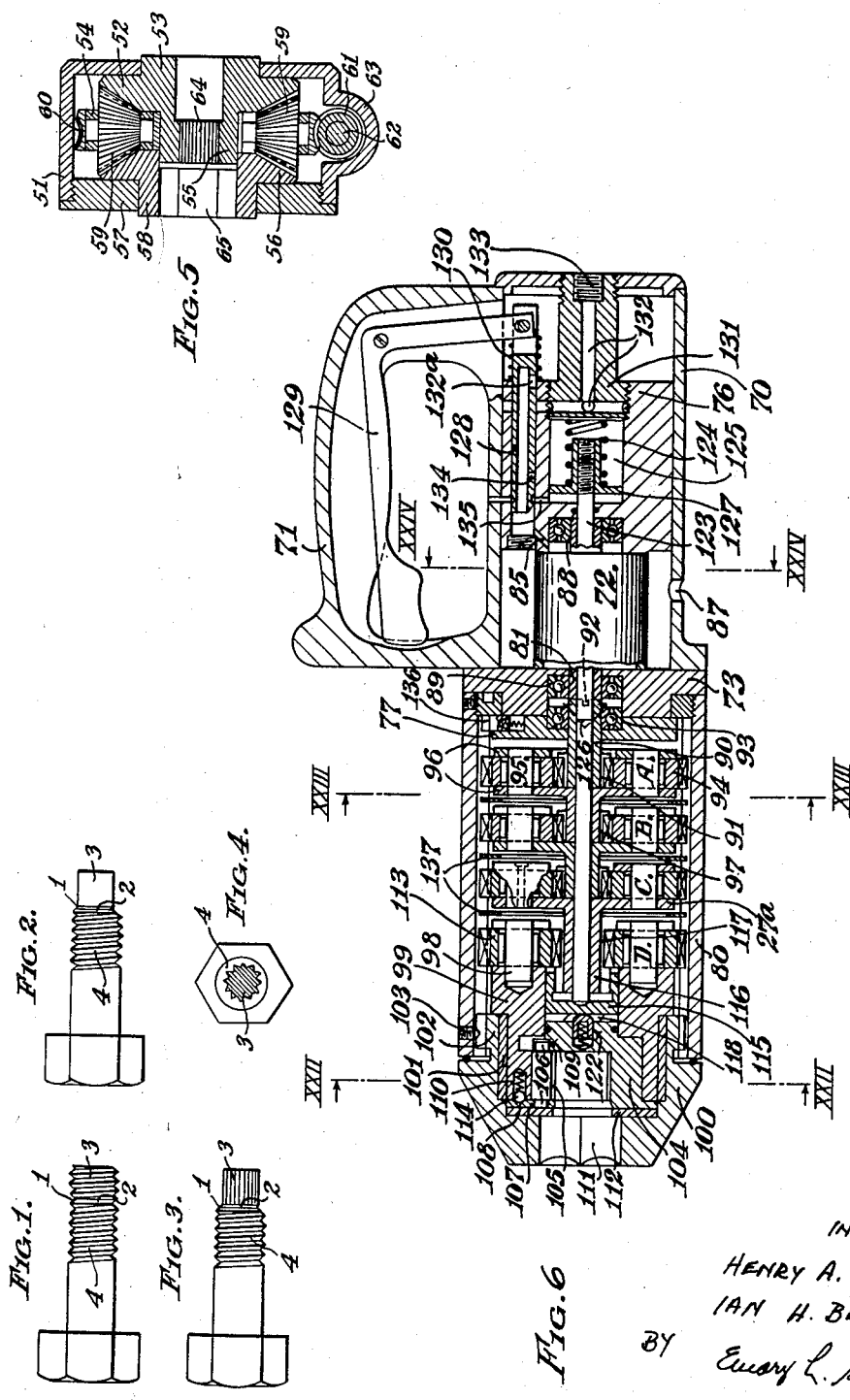
INVENTORS
HENRY A. OWEN
IAN H. BRODEY
BY Emory L. Groff
ATTY

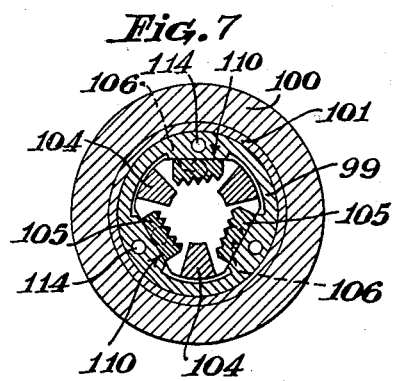
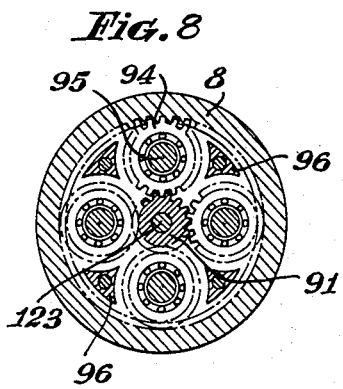
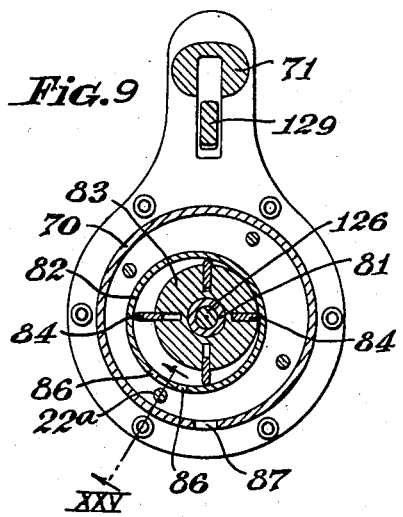
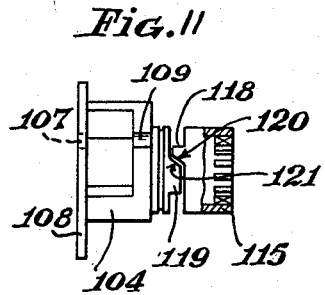
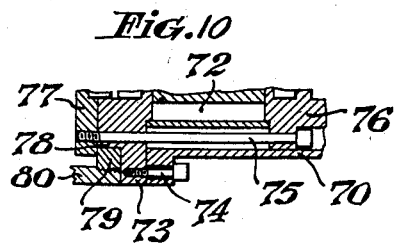
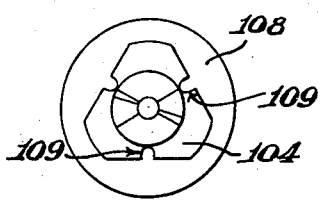

United States Patent Office 2,928,302
Patented Mar. 15, 1960

2,928,302

MEANS FOR ACHIEVING A PREDETERMINED EXTENT OF LOADING IN TIGHTENING UP NUTS ON BOLTS AND STUDS

Henry Arthur Owen and Ian Henry Brodey, Banbury, England

Application June 19, 1956, Serial No. 592,353

Claims priority, application Great Britain June 29, 1955

11 Claims. (Cl. 81—56)

This invention relates to means for achieving a predetermined extent of loading when tightening up nuts on bolts and studs, and provides a bolt or stud adapted to achieve this result when employing an appropriate tool for tightening up the nut, the bolt or stud having a tool-anchoring part which shears off when a predetermined extent of reaction torque has been applied thereto in tightening up the nut. The invention also provides a nut-manipulating tool for taking anchorage on the said part of the bolt or stud and for applying to the nut that amount of torque dictated by the reaction stress which the tool-anchoring part of the bolt can suffer before the same shears off.

In the following description, for the sake of simplicity, the term "bolt" will be used as denoting a bolt or stud, and it is to be understood that the term "nut" is to be construed as embracing any internally-threaded member of any shape or form which is to screw onto the bolt and to be tightened up against any member through which the bolt is passed.

The invention provides a tool for use in conjunction with a bolt including a shank formed with a screw-threaded portion, and shearable means incorporated with said shank, said shearable means being of lower strength than said screw-threaded portion, whereby said shearable means will break off when subjected to a predetermined extent of reaction thrust applied thereto when tightening up a nut on said screw-threaded portion by a tool applying thrust differentially on said shearable means and nut. The bolt may have a stem prolongation beyond the screw threaded portion, this prolongation being connected to the said screw threaded portion by a connecting portion of lower strength than said screw-threaded portion and prolongation; thus, the prolongation and connecting portion will constitute the shearable means since the connecting portion will shear and the prolongation accordingly will break off. The connecting portion of lower strength may be formed by grooving the bolt around its periphery; the prolongation may be a threaded portion of the stem which remains after cutting a groove therein, or a plain-surfaced stem portion capable of being gripped by a wrench-like part of the tool, or a stem portion having a non-circular configuration for non-rotatable engagement with a complementary part of the tool.

The shearable means affords anchorage for one element of a tool which operates to set up a thrust-differential effect as between said element and another element engageable with a nut screwed onto the bolt. The relatively lower strength of the shearable means is of a predetermined value to cause the shearing to take place with consequent ineffective functioning of the tool when the nut has been tightened up to an extent corresponding to the ultimate shear stress which can be suffered by the shearable means. If such shearable means is a prolongation of the bolt stem the shear stress suffered will be a torsional one.

According to this invention there is provided a tool for use in conjunction with a bolt having a shank provided with a shearable portion in applying turning movements in opposite directions to said shearable portion and to a nut screwed on said bolt respectively, said tool including a rotatable anchoring element, anchorage means incorporated with said anchoring element for non-rotatably engaging said shearable portion, a rotatable operating element incorporating a socket for engaging and turning a nut fitted on said bolt shank, said anchoring element and said operating element being disposed with said anchorage means and said socket in side-by-side and co-axial relationship, and driving means operatively associated with said anchoring and operating elements, said driving means turning said anchoring element in one direction and turning said operating element in the opposite direction. The said anchoring and operating elements may be driven through differential gearing or mechanism, each of said elements turning with respect to a body part of the tool.

The anchoring element includes a socket member which either has an internal formation (other than a plain cylindrical one) conforming to the bolt portion which it is to engage, for instance, polygonal in cross-section, fluted or ribbed, or else incorporates a one-way clutch such as one comprising an arrangement of movably-mounted gripping members which are pressed against the said portion of the bolt (thereby to grip the same) by a wedge or cam action due to said anchoring element being subjected to the reaction thrust.

The invention will be readily understood from the following description and in the accompanying drawings wherein:

Figures 1, 2 and 3 are side elevations of bolts of three different forms for use in conjunction with the tool provided by this invention.

Figure 4 is an end elevation of the bolt shown in Figure 3.

Figure 5 is a section through one form of tool provided by the invention and incorporating simple differential gearing.

Figure 6 is a longitudinal section through another form of tool according to the invention, such tool embodying a driving motor and a train of epicyclic gears.

Figures 7, 8 and 9 are cross-sections on lines XXII—XXII, XXIII—XXIII, and XXIV—XXIV respectively, in Figure 6.

Figure 10 is a section on line XXV—XXV in Figure 9.

Figure 11 is part-sectional side elevation of a cage member and related part shown in Figure 6 and Figure 12 is a rear face view of the cage member shown in Figures 6 and 11.

The bolt shown in Figure 1 has the characteristic feature that a groove 1 is formed in the threaded portion of the stem of said bolt intermediately in the length of said stem. This groove produces a portion 2 of lower strength than the remainder of said stem and defines a prolongation 3 which is connected to the main portion 4 of the stem by said lower strength portion 2.

The bolt shown in Figure 2 is similar to the bolt shown in Figure 1 but differs in that the prolongation 3 has a plain and smooth periphery, said prolongation having a diameter no greater than the root diameter of the screw thread of the stem portion 4. If desired the said prolongation 3 may have a serrated periphery.

The bolt shown in Figures 3 and 4 is similar to that shown in Figure 2, but differs in that the prolongation 3 is longitudinally fluted or ribbed.

In each case the prolongation 3 of the bolt stem affords engagement for an anchoring portion of the operating tool; in regard to Figures 1 and 2, said prolongation 3 will be engaged by a one-way clutch incorporated with the tool (later herein described) whilst in regard to Figure 3 the prolongation 3 by its configuration affords non-rotational engagement for a correspondingly shaped anchoring portion of the tool. As later herein described the tool used operates to apply torque in opposite directions on the bolt prolongation 3 and on a nut screwed on to the bolt stem, i.e. differentially; thus the prolongation will resist turning of the part of the tool engaged therewith with consequent turning of the nut in screwing the same up against a surface or part. When the reaction thrust imposed on the prolongation 3 reaches a predetermined value, determined by the ultimate strength of the stem portion 2, the said prolongation 3 will shear off and therefore no further tightening of the nut will take place since the differential thrust action is relied on for the tightening of said nut. Therefore the bolt is made with the portion 2 of predetermined strength, in the sense of the ultimate torsional shear stress which the same will resist prior to shearing; this ultimate torsional shear stress governs the extent to which the nut can be tightened. In practice the groove 1 is made of predetermined depth to give the portion 3 the required low-strength value.

One form of tool according to the invention is shown in Figure 5. In this construction the anchoring and operating elements are constituted by mutually-opposite sun wheels of a differential gearing. The tool is built up from a set of principal components comprising a casing body 51, a sun wheel 52 having a boss 53 journalled in an opening in an end wall of said casing body, a planet gear carrier 54 rotatably mounted on a sleeve extension part 55 of sun wheel 52, a sun wheel 56, and a closing plate 57 which screws into the mouth of the casing body 51 to maintain the parts assembled. The sun wheel 56 has a sleeve extension 58 journalled in an opening in the closing plate 57. The planet gear carrier 54 embodies a set of planet pinions 59 meshing with the sun wheels 52 and 56 as usual in differential gearing. Said planet carrier 54 has a body part in the form of a ring formed peripherally as a worm wheel (as denoted by reference 60) which meshes with a driving pinion 61 fixed on a shaft 62. Pinion 61 is housed in an extension 63 of the casing body 51, the shaft 62 being journalled in opposite end walls of said casing extension 63, and projecting from one or each end thereof so as to enable a drive to be imparted to it. The sun wheel 52 (e.g. the sleeve portion 55 thereof in the example shown) is formed internally (as at 64) with ribs or flutes to match with the peripheral contour of the bolt stem prolongation 3 (Figure 3) or is otherwise shaped in correspondence with said part 3 to prevent rotation of the sun wheel 52 with respect thereto. Or, said sun wheel may be equipped with a one-way clutch. The sun wheel 52 thus constitutes the anchoring element of the tool. The operating element of the tool is constituted by the sun wheel 56, the latter accordingly being shaped internally (as at 65) in correspondence with the nut which it is to engage.

By imparting a drive to the shaft 62 the planetary gear carrier 54 will be rotated, and as the sun wheel 52 cannot turn on the bolt, the other sun wheel 56 will be rotated by the planet wheels rolling around the wheel 52. Eventually, when the force opposing the rotation of the sun wheel 56 (due to the tightening up of the nut) exceeds the ultimate torque strength of the shearable portion of the bolt, the prolongation 3 of the bolt will shear off, with the result that the sun wheel 52 will turn idly in allowing the planet pinions 59 to roll around the sun wheel 56.

Another form of nut-operating tool in accordance with the invention is shown in Figures 6 to 12, this tool incorporating a motor driven by compressed air or other fluid and a reduction gearing of multi-unit epicyclic form by means of which said motor imparts a drive to a socket constructed to engage on the nut which is to be tightened, the final driven unit of said gearing having gear elements associated one with the said nut-engaging socket and another with an anchoring element for engagement with the prolongation of the bolt, so that there will be relative turning of the said socket and anchoring element by the said gear elements of said final unit until the prolongation of the bolt shears off. This tool comprises two main sections secured together, the rear section which is shown on the right-hand side of Figure 6 being a body comprising a casing 70 carrying a handle 71 and housing a fluid motor 72 and control means therefor as hereinafter described, the front section which is shown on the left-hand side of this figure incorporating the epicyclic gearing units and the nut-operating socket and bolt-engaging anchorage means associated with said gearing. At its front end the rear section has an end plate 73 secured to the casing 70 by bolts 74 (Figure 10) this plate 73 being a closing plate for the front end of the motor 72. Other bolts 75 situated in passages formed in an inner body 76 housed within the case 70 pass through the plate 73 and screw into a retaining plate 77 disposed in front of the end plate 73, this plate 77 being in effect a rear end plate for the front section of the tool. The bolts 75 thus serve to hold plate 77 against plate 73 and as shown in Figure 10 they may also be the means for holding the inner body 76 in position to constitute a back plate for the motor 72, or separate means may be provided for securing said inner body 76 in the required position within the casing 70. The retaining plate 77 overhangs a smaller diameter boss 78 of plate 73 and thereby holds in place between plate 77 and the main larger portion of plate 73 an externally threaded ring 79 which has a free rotational fit between said plates 73 and 77. This ring 79 serves as an anchorage for a sleeve 80 which is internally toothed throughout its length to constitute a toothed annulus common to the several epicyclic gear units situated within said sleeve 80 and arranged as hereinafter set forth. The boss 78 serves in effect as a bearing about which rotates the ring 79 secured in the sleeve 80.

The fluid motor 72 can be of any known type having a driven rotor secured to a tubular shaft 81. In the example illustrated (see Figure 9) the motor comprises an eccentrically-disposed casing 82 housing a rotor 83 which is concentrically fitted on shaft 81 and equipped with vanes 84 slidable in slots formed radially in said rotor 83, said vanes being adapted to bear on the internal surface of casing 82 and being spring-loaded if necessary. This form of motor is well-known in itself and it is believed that no further description of the same or its operation is necessary. Air or other fluid for driving the motor enters said motor by way of a duct 85 (Figure 6), the exhausted fluid escaping by way of ducts 86, 87 in the casings 82 and 70 respectively.

The tubular motor shaft 81 is journalled in a rear bearing 88 housed in a front recess in the inner body 76, the front bearing 89 for said shaft being housed in a recess in the plate 73. Said tubular shaft 81 extends only part way through bearing 89, this bearing 89 also receiving an end portion of a tubular stem 90 of a sun-pinion 91, the meeting ends of parts 81 and 90 in the bearing 89 being formed with interengaging dog clutch formations as denoted by reference 92 in Figure 6. For additional support the stem 90 of pinion 91 runs in a journal bearing 93 accommodated partly in the recess aforesaid in plate 73 and partly in a recess in plate 77.

The sun pinion 91 is one element of the first epicyclic gear unit A; this unit comprises also a set of planet pinions 94 mounted on shafts 95 carried by a cage 96, said pinions 94 meshing with the internal teeth of sleeve 80. The planet cage 96 is solid with the sun pinion 97 of the next gear unit B which is of the same form as unit A. Likewise the planet cage of unit B is unitary with the sun pinion of unit C, and the planet cage of unit C is unitary with the sun pinion of unit D, the units B and C also being of the same form as unit A. Thus, each of the units, A, B, C and D is a reduction gear, these units being driven one from another to form a reduction gear train affording greatly increased torque in correspondence with speed reduction. In respect of the final unit D the spindles 98 of the planet pinions thereof are carried by a collet-housing 99 rotatably mounted within a head piece 100, a bearing liner 101 being interposed between said piece and collet-housing. The head piece 100 has a boss 102 which enters the sleeve 80 and has external teeth located between the internal teeth of said sleeve 80, said boss being secured within said sleeve by a grub screw 103.

A cage member 104 is freely mounted within the collet-housing 99 and carries wedge-shaped shoes 105 (Figure 7). Each of these shoes has spindles 106 projecting from its opposite ends. One of these spindles is mounted in a hole 107 in an end plate portion 108 of part 104, the other spindle seating into a notch 109 of said part 104. Each shoe 105 is permitted a slight extent of floating movement radially with respect to the axis of the tool, the hole 107 accordingly being slightly elongated in that direction. As shown in Figure 7, each shoe 105 has a flat rear face contacting with a flat internal face 110 of the collet-housing 99. The shoes 105 are adapted to travel slidably along the faces 110, and by reason of said shoes being wedge-shaped as shown in Figure 7, this travel will result in the inwardly-directed faces of said shoes approaching towards or receding from the axis of the tool. Such travel of the shoes takes place by relative rotation of parts 99 and 104 as later described. Thus, the shoes 105 conjointly form a contractible collet and they are adapted to impose a grip on the periphery of a prolongation portion of a bolt constructed as aforesaid, such bolt prolongation being passed through a socket hole 111 in the head piece 100 and through a centre opening in a friction disc 112 so as thus to enter the cage member 104. To afford a good grip on the bolt prolongation the inwardly-directed faces of the shoes 105 may be serrated as shown.

The socket hole 111 in the head piece 100 is shaped and dimensioned in accordance with the nut which is to be tightened up on the bolt, as it is intended to receive such nut.

It will be realized that by reason of head piece 100 being compelled to turn in unison with the toothed sleeve 80 common to the train of epicyclic gears, whereas the collet housing 99 must turn in unison with the set of planet members 113 of gear unit D there will be relative rotation of said parts 100 and 99 when the motor 72 drives the gearing. The relative direction of rotation is such that the head piece 100 turns the nut in a direction to tighten the same while the bolt is being rotated in the opposite direction by the collet-housing 99 due to the set of shoes 105 obtaining a firm grip on the prolongation of the bolt. In practice it may be necessary for the bolt to remain stationary but in fact it will be of no consequence whether the part 99 or the part 100 remains stationary as there will in any case be the same relative turning of these parts due to a differential effect.

It will be realized that it is necessary to make some provision for turning part 104 relative to part 99 in order to impart slidable movement to the shoes 105 to bring said shoes into gripping contact with the prolongation of the bolt, after which the thrust which the bolt periphery imposes on said shoes will urge said shoes in directions to maintain and increase the grip. For this relative turning movement of parts 104 and 99, the part 104 is urged to turn with the head piece 100 by reason of the friction disc 112 having frictional contact with said parts 100 and 104. To impose the required pressure of the friction surfaces there is provided a set of spring-loaded plungers 114 mounted in cavities in the member 99, these plungers pressing the part 104 towards the nose of part 100. Thus, at the outset the part 104 will tend to turn with part 100 but when the shoes 105 obtain a grip on the bolt the said part 104 will turn as a unit with the part 99 or remain stationary therewith as the case may be.

The tool further incorporates means for slidably retracting the shoes 105 so as to cause the same to release their grip on the severed-off portion of the bolt which remains within the part 104. Such means comprises a cupped member 115 which is internally toothed to mesh with a ring of teeth on the periphery of an extension 116 of the sun pinion 117 of gear unit D. The base of this cupped member 115 has dog-tooth formations 118 capable of engaging between like formations 119 on the back of part 104 (see Figure 11). When having regard to the direction in which the cupped member 115 will be turned by part 116, the dog teeth 118 on such member 115 have inclined leading edges 120 for contact with inclined trailing edges 121 on part 104, the inclination tending to effect disengagement, i.e., displacement of part 115 in a direction away from part 104. It is obvious that these dog-teeth formations must not be inter-engaged when the tool is operating as aforesaid, and to ensure their nonengagement at such time there is provided a spring-loaded plunger 122 which urges part 115 away from part 104. This plunger 122 acts in opposition to a push rod 123 urged forwards by a spring 124 housed within a chamber 125 in the inner body 76. This push rod 123 (which may comprise two sections abutting each other at 126 and which are capable of relative rotation) is fitted with a piston 127 slidable in the chamber 125. The compressed air or other fluid which drives the motor 72 is used also as the means for imparting a thrust on piston 126 to retract the push rod 123. Control of the air or other fluid to the motor 72 and to the front end of chamber 125 is effected by a valve member 128 slidable in a bore in the inner body 76, said valve member being coupled to a lever 129 having a manipulating part convenient for operation by a finger of the hand which grips the handle 71. The valve member is urged in a rearward direction by a spring 130.

A rear piece 131 screwed into the open rear end of the inner body 76 has formed therein a fluid passageway 132 leading from a socket 133, said socket serving for the connection of a pipe line supplying fluid under pressure to the tool. The passageway 132 leads to the bore housing the valve member 128. This valve member is hollow and has an inlet port 132a for registering with said passageway, and it also has a delivery port 134 for registering with a duct 135 leading into the front end of the chamber 125. The fluid is also free to pass from the interior of valve member 128 to the duct 85 and thence into the motor.

The tool is employed to tighten up a nut already engaged on a bolt which, as aforesaid has a prolongation beyond a weakened zone. In using the tool the socket 111 is engaged with the nut, the bolt prolongation entering the collet-housing 99. The control lever 129 is then actuated with the result that the valve port 132a comes into register with the fluid passageway 132 and the fluid thus enters the valve 128 and passes to the motor via duct 85. The motor then commences to operate and, via gear units A, B, C and D, to turn part 99 relative to part 100, momentarily the inter-engaged dog teeth 118, 119 prevent the cage member 104 turning with respect to the collet housing 99. However, by reason of the valve port 134 having come into register with port 135 of chamber 125, so that almost instantly the piston 127 is forced back in opposition to spring 124 and carries with it the rear portion of rod 123. This allows the front portion of rod 123 to be thrust back by the spring plunger 122. Thus, the dog teeth 118 and 119 take up positions out of engagement with each other. The motor continues to impart a drive to the epicyclic gearing to turn the collet housing 99 relative to the head piece 100. The initial relative movement of said parts 99 and 100 results in the flat internal faces 110 of the part 99 sliding over the backs of the shoes 105 in directions towards the thicker ends of said shoes; this occurs due to the friction washer 108 urging the cage 104 to turn with the head 100. By reason of the shoes 105 being displaced relative to the collet housing 99 they will impose a grip on the prolongation of the bolt. By the continued operation of motor 72 the rotating head piece 100 will rotate the nut engaged in the socket hole 111, the rotation being in a direction to tighten the nut. The bolt meanwhile is being rotated in the opposite direction by the collet-housing 99 or is being kept stationary by said housing as the case may be. When the nut has been screwed home to an extent such that the reaction torque thrust imposed on the bolt prolongation by the collet-housing 99 exceeds the maximum shear stress which the weakened portion of the bolt can suffer, the prolongation of said bolt shears off. Consequently, the collet-housing 99 can rotate freely, the sheared-off portion of the bolt being still within said collet housing. The control lever 129 is now allowed to fall back to restore the valve 128 under the influence of spring 130. Consequently, the valve port 134 moves out of register with the port 135 of chamber 125 to cut off fluid flow to the latter. In consequence spring 124 exerts itself to push the rod 123 forwards, the fluid which remains in the front end of chamber 125 being expelled therefrom via duct 135. The push rod 123 thus forwardly displaces the cupped member 115 to bring the dog teeth 118 and 119 into engagement with one another. Fluid cut-off to the valve 128 (and motor 72) takes place very slightly after cut-off by port 134 as regards valve movement, thus tending to retard very slightly the moment of motor cut-off. It will be realized that the parts 104 and 115 (which carry the dog teeth) are still turning at different speeds due to over-run of the motor even after the valve 128 has cut off the fluid flow to said motor. Consequently, when the sets of dog teeth 118 and 119 engage each other the cage 104 will receive a sudden kick which turns the same relative to the collet housing 99 in a direction to throw back the shoes 105, thicker ends foremost, along the faces 110 of said collet-housing 99. The effect of this is to release the severed-off portion of the bolt ready for the same to drop out on holding the tool with its nose pointing downwards. Any risk of imposing too great a load on the parts of the tool when the dog-teeth 118 and 119 perform the aforesaid duty, is avoided by reason of the inclined abutting edges 120 and 121 tending to ride upon each other to disengage said dog teeth, the tension of spring 124 governing the torque load value at which such disengagement will occur.

In order to avoid any possibility of the casing 70 with its handle 71 being swung over by torque reaction through the gearing, there is provided a spring-loaded pawl 136 carried by plate 77, this pawl having a bevelled surface engaging with the teeth on the interior of sleeve 80. The bevel shaping of this pawl is such as to permit the sleeve 80 to turn relative to plate 77 in the direction for tightening of the nut, but to prevent turning of said plate 77 in a reverse direction relative to sleeve 80.

Reference 137 denotes contractible spring rings which snap outwards into annular grooves in the sleeve 80 and which serve to locate the planetary elements of the epicyclic gear units.

It will be understood that in using the tool of either form above described, the nut is initially screwed on to the bolt to a suitable extent, the tool being then passed over the end of the bolt stem to engage the socket of the operating tool with the nut and to engage the anchoring element with the prolongation of the bolt stem. The tool is then operated or caused to operate to tighten the nut to the extent determined by the torque stress which the shearable portion 2 of the bolt can suffer before the prolongation 3 breaks off; when this takes place the tool is rendered ineffective for further tightening of the nut.

We claim:
1. A tool for use in conjunction with a bolt having a shank provided with a shearable portion in applying thrust differentially on said shearable portion and on a nut screwed on said bolt, said tool comprising a body, an anchoring element rotatably carried by said body, anchorage means incorporated with said anchoring element for non-rotatably engaging said shearable portion, and operating element rotatably carried by said body, said operating element incorporating a socket for engaging and turning a nut fitted on said bolt shank, said anchoring element and said operating element being disposed with said anchorage means and said socket in side-by-side and co-axial relationship, said anchoring element and said operating element being rotatable about the axis common to said anchorage means and socket, and driving means incorporated with said body, said driving means comprising a motor carried by said body and multi-stage epicyclic gearing arranged as a reduction gearing and driven by said motor, the final stage of said gearing having parts drive-coupled to said anchoring element and operating element respectively so as to turn said elements differentially.

2. A tool according to claim 1, wherein the said motor and epicyclic gearing are coaxial with said anchoring and operating elements, the said operating element being a nose part of the tool.

3. A tool according to claim 2, wherein said motor is drive-coupled to a sun-wheel of a first stage of said multistage epicyclic gearing, and wherein a planetary element of each stage of said gearing, except the final stage, directly turns the sun-wheel of the next stage, and a toothed outer sleeve common to all of the stages of said gearing meshes with the planetary pinions of said stages, said sleeve and a planetary element of the final stage imparting direct turning movements to said operating element and anchoring element respectively.

4. A tool for use in conjunction with a bolt having a shank provided with a shearable portion in applying thrust differentially on said shearable portion and on a nut screwed on said bolt, said tool comprising a body, an anchoring element rotatably carried by said body, anchorage means incorporated with said anchoring element for non-rotatably engaging said shearable portion, an operating element rotatably carried by said body, said operating element incorporating a socket for engaging and turning a nut fitted on said bolt shank, said anchoring element and said operating element being disposed with said anchorage means and said socket in side-by-side and co-axial relationship, said anchoring element and said operating element being rotatable about the axis common to said anchorage means and socket, and driving means incorporated with said body, said driving means comprising a ring of sun-wheel teeth on said anchoring element, a ring of sun-wheel teeth on said operating element, a planetary gear member situated between said anchoring and operating elements, said planetary gear member being rotatable about an axis common to said rings of sun-wheel teeth and planet pinions incorporated with said planetary gear member, said planet pinions meshing with said rings of sun-wheel teeth, said planetary gear member being rotated by said driving shaft.

5. A tool for use in conjunction with a bolt having a shank provided with a shearable portion, in applying thrust differentially on said shearable portion and on a nut screwed on said bolt, said tool comprising a body, an anchorage element rotatably carried by said body, anchorage means incorporated with said anchoring element for gripping said shearable portion, said anchorage means including a set of gripping members movably carried by said anchoring element and means for closing said gripping members towards each other when said gripping members are displaced with respect to said anchoring member, an operating element rotatably carried by said body, said operating element incorporating a socket for engaging and turning a nut fitted on said bolt shank, said anchoring element and said operating element being disposed with said anchorage means and said socket in side-by-side and co-axial relationship, said anchoring element and said operating element being rotatable about the axis common to said anchorage means and socket, driving means incorporated with said body, said driving means including a driving shaft rotatably carried by said body and differential mechanism driven by said driving shaft for operating said anchoring and operating elements differentially for rotation of each of said elements with respect to said body, and frictional means urging said gripping members to turn initially with said operating member so as to become displaced with respect to said anchoring element until they obtain a grip on the prolongation of the bolt.

6. A tool according to claim 5, having means operated from said driving shaft for imparting a reverse displacement to said gripping members with respect to said anchoring element, thereby to cause said shoes to release the sheared-off portion of the bolt.

7. A tool according to claim 6, wherein the said means for effecting reverse displacement of the gripping members comprises inter-engageable dog teeth provided one set of a cage which carries said members and one set on a slidable member rotated at a speed other than the speed of said cage, and thrust means yieldingly pressing said slidable member into a position for inter-engagement of said teeth, the said teeth having inclined abutting faces for effecting automatic disengagement of said dog teeth when said members reach their ultimate positions of reverse displacement, said thrust means having an inoperative retracted position until reverse displacement of said members is required.

8. A tool according to claim 7, wherein said driving means incorporates a motor driven by fluid pressure, and wherein the said thrust means for bringing the said dog teeth to inter-engaging positions is spring urged to its operative position but forced back to a retracted position by a ram which is also subjected to the said fluid pressure while the tool is performing the nut-tightening operation.

9. A device according to claim 8, having a single manually-operable valve for controlling the supply of fluid pressure to both said motor and ram.

10. A tool according to claim 9, wherein said body includes a handle and wherein the said valve controlling said motor and ram has a manipulating part disposed in close proximity to said handle so as to be operable by the hand which grips said handle.

11. A tool as claimed in claim 8, having epicyclic gearing for differentially driving the said anchoring and operating elements, said gearing comprising a sun wheel, a planetary element carrying a set of planet pinions meshing with said sun wheel and an internally-toothed outer sleeve, said planetary element and said sleeve imparting rotation directly to said anchoring element and said operating element respectively, the said slidable member carrying one set of dog teeth being rotated by said sun-wheel, the said thrust means which co-operates with said slidable member comprising a rod situated at the axis of said gearing, said rod passing through said gearing and through a hollow shaft of said motor and thus reaching to said ram, said ram being housed within said body.

References Cited in the file of this patent

UNITED STATES PATENTS

| | | |
|---|---|---|
| 1,257,275 | Sartain | Feb. 19, 1918 |
| 1,343,667 | Evensen | June 15, 1920 |
| 1,426,098 | Pruitt | Aug. 15, 1922 |
| 2,054,060 | Morris | Sept. 8, 1936 |
| 2,536,225 | Rice | Jan. 2, 1951 |
| 2,544,522 | Bertelsen | Mar. 6, 1951 |
| 2,572,613 | Goff | Oct. 23, 1951 |
| 2,575,525 | Mitchell | Nov. 20, 1951 |
| 2,580,247 | Secondi et al. | Dec. 25, 1951 |
| 2,740,315 | Gouverneur | Apr. 3, 1956 |
| 2,745,303 | Cornelius | May 15, 1956 |
| 2,760,393 | Stough | Aug. 28, 1956 |
| 2,760,394 | Wragge | Aug. 28, 1956 |
| 2,776,681 | Hopkins | Jan. 8, 1957 |